Nov. 25, 1930.   G. R. WHITE   1,783,029
ORNITHOPTER
Filed Oct. 31, 1927   5 Sheets-Sheet 1

INVENTOR
George R. White
BY
george Ramsey
his ATTORNEY

Nov. 25, 1930.          G. R. WHITE                 1,783,029
                        ORNITHOPTER
                   Filed Oct. 31, 1927      5 Sheets-Sheet 2
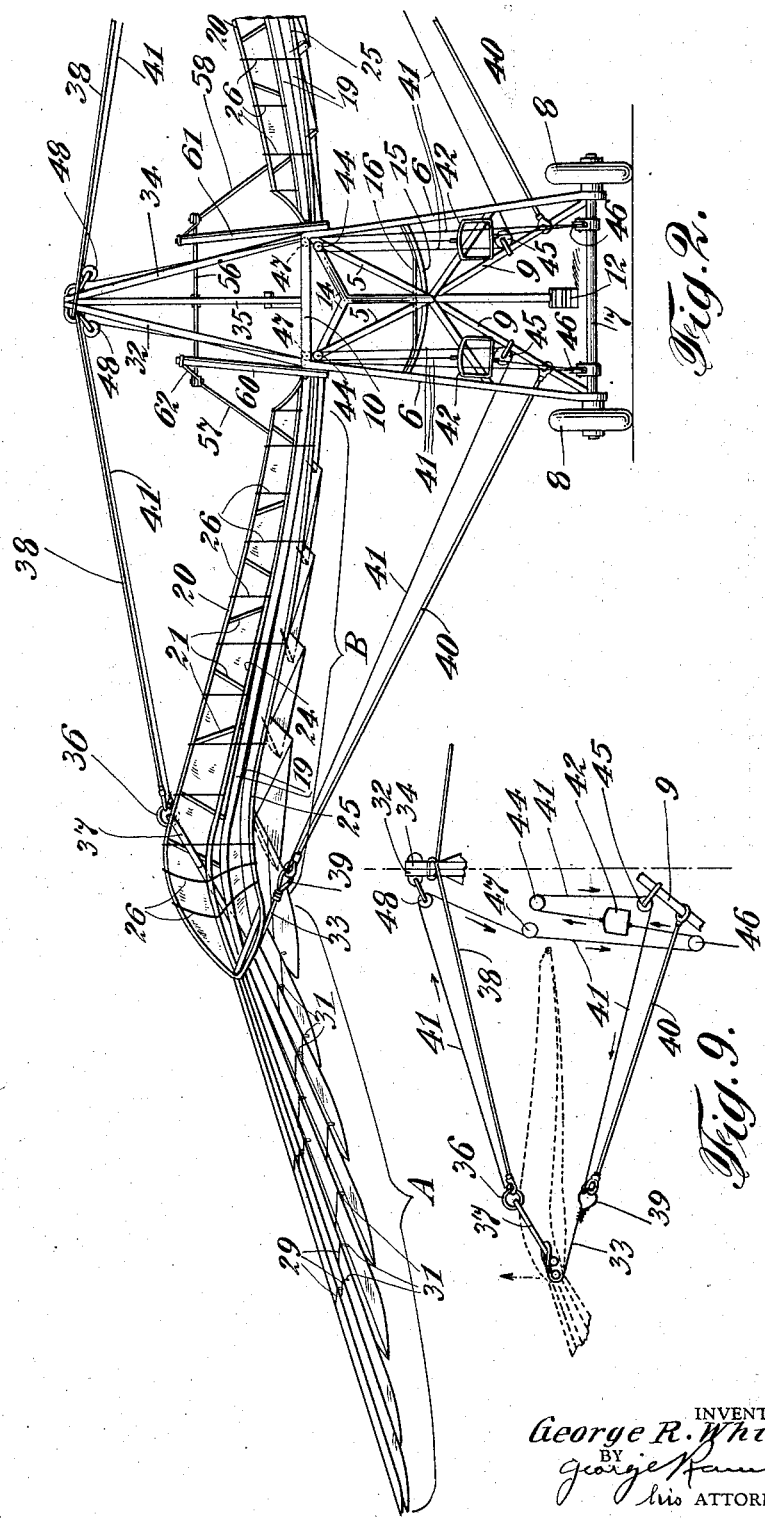

Nov. 25, 1930.  G. R. WHITE  1,783,029
ORNITHOPTER
Filed Oct. 31, 1927  5 Sheets-Sheet 3
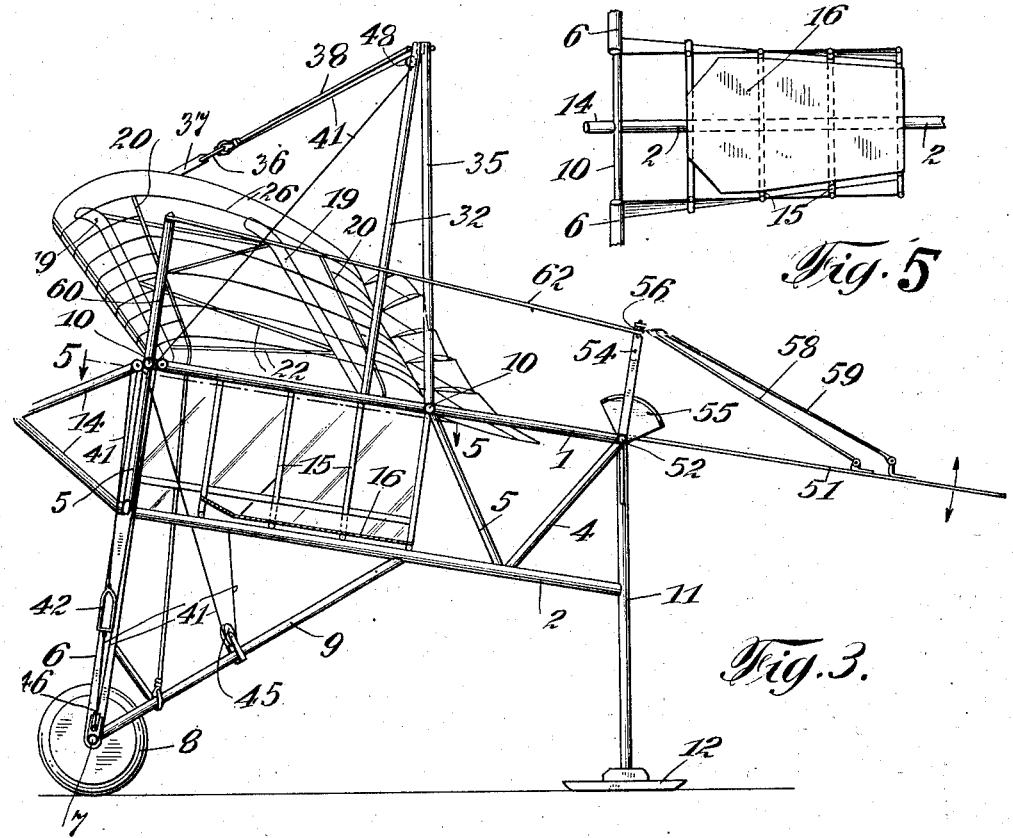
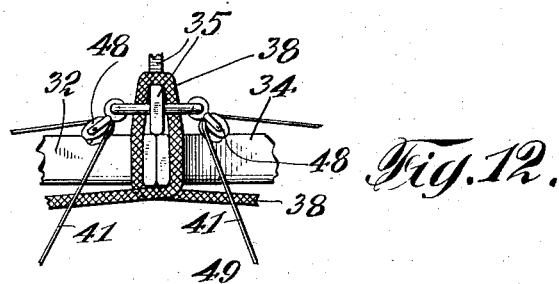
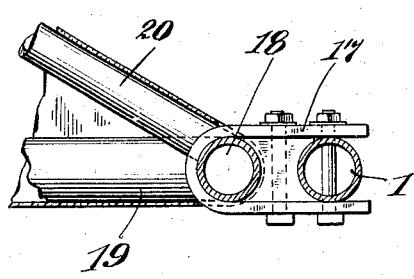
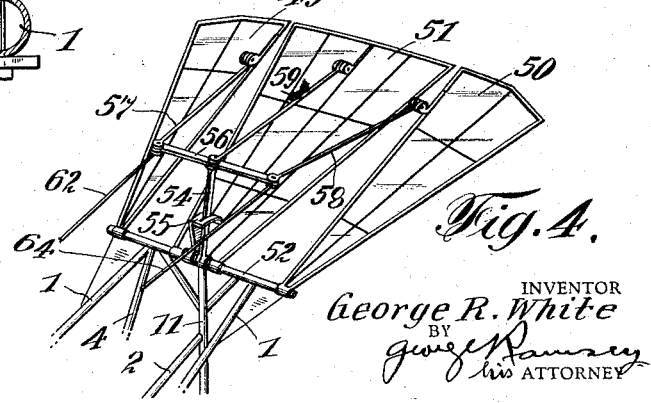
INVENTOR
George R. White
BY
his ATTORNEY Nov. 25, 1930.   G. R. WHITE   1,783,029
ORNITHOPTER
Filed Oct. 31, 1927   5 Sheets-Sheet 4
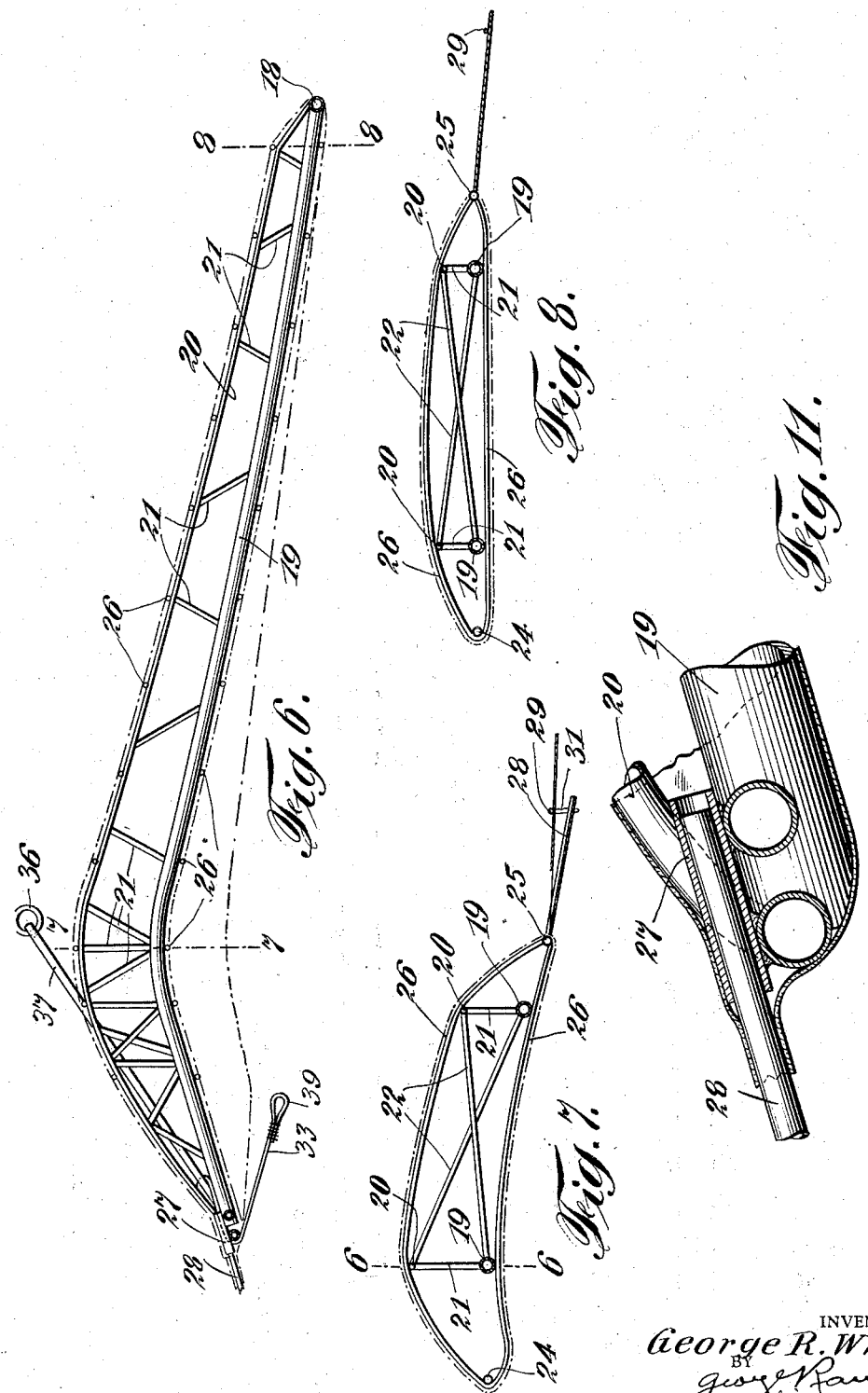
INVENTOR
George R. White
BY
his ATTORNEY

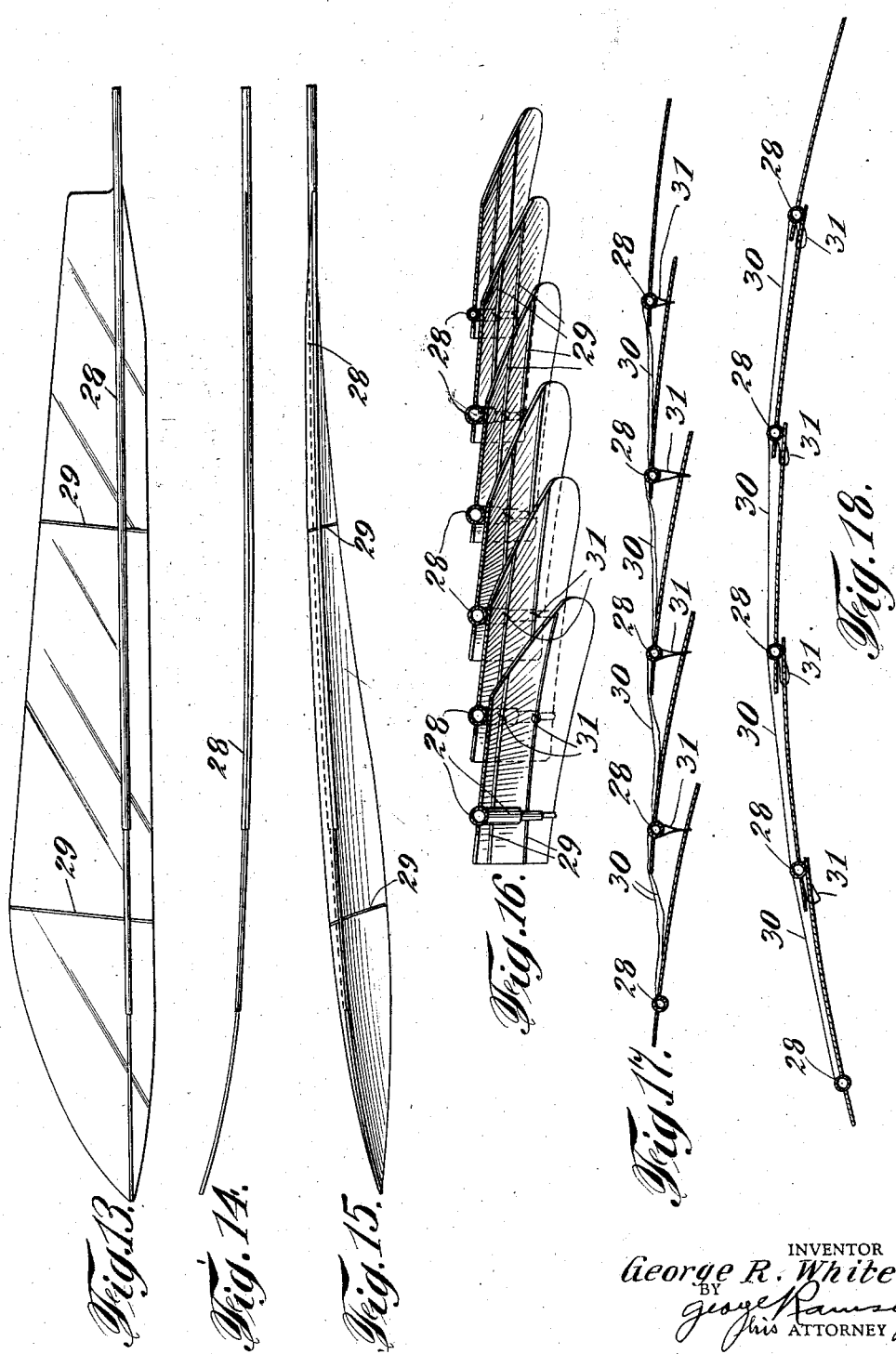

Patented Nov. 25, 1930

1,783,029

UNITED STATES PATENT OFFICE

GEORGE R. WHITE, OF STONY BROOK, NEW YORK

ORNITHOPTER

Application filed October 31, 1927. Serial No. 229,884.

The present invention relates broadly to aeronautics and more specially to a heavier than air machine of the ornithoptic type.

One object of the present invention is to simulate bird flight by a heavier than air flying machine having the wings thereof constructed in such a manner as to be operated to control and support the machine in flight as well as to propel the machine forward during flight.

Another object of the invention is a heavier than air flying machine with the wings thereof having individualized portions adapted to flex in such manner as to cause forward propulsion similar to sculling of a boat with an oar or a plurality of oars.

A still further object of the present invention is a heavier than air flying machine of the ornithoptic type whereby the wings are adapted for movement to change the angular relation of the wings to the body of the machine and wherein the wings comprise rigid air-foil sections to which flexible individualized extensions are adapted to form the extremities of the wings and the trailing edges thereof.

A still further and more detailed object of the present invention is a heavier than air flying machine of the ornithoptic type in which the wing comprises an air-foil section from which feather-like members extend and which members are flexible to permit these members to exert a sculling action when the wing is moved or beat in the simulation of the movement of a bird's wing.

A still further object of the present invention is a heavier than air flying machine of the ornithoptic type and wherein elastic cables under tension are provided to stabilize said wings to compensate for the supporting of said wings on the body of the machine in such maner as to permit a relatively small force to oscillate said wings while the machine is in flight.

A further and more detailed object of the present invention is a heavier than air flying machine of the ornithoptic type wherein the wings of said machine comprise rigid air-foil sections and individualized sections; and with elastic cables extending from the body of the machine to the air-foil sections whereby the cables when under tension maintain the normal dihedral angle of the wings such as to prevent the spilling of air out from under the tips of the wings and to enable the wings to be vibrated while in flight without expending power to retain the wings in supporting position.

A further object of the present invention is a heavier than air flying machine of the ornithoptic type with a wing comprising a rigid air-foil section and flexible individualized feather-like members extending from said air-foil section and with the parts being angularly arranged relative to a vertical plane through said section whereby there is provided a substantially dihedral angle adjacent the outer end of the air-foil section.

Other and further objects of the present invention will in part be obvious and will in part be pointed out by reference to the accompanying drawings forming a part of the specification. It is realized that the present invention may be embodied in constructions other than those specifically disclosed herein and therefore this disclosure is to be understood as illustrative and not in the limiting sense.

Fig. 2 is a front view of the device disclosed in Fig. 1.

Fig. 3 is a vertical sectional view taken on line 3—3 of Fig. 1.

Fig. 4 is a detailed view of the rear elevators.

Fig. 5 is a plan view of the body of the machine taken on lines 5—5 of Fig. 3.

Fig. 6 is a sectional view of an air-foil member taken on line 6—6 of Fig. 7.

Fig. 7 is a cross-sectional view of a rigid air-foil of a wing taken on line 7—7 of Fig. 6.

Fig. 8 is a cross-sectional view of the inner end of an air-foil taken on line 8—8 of Fig. 6.

Fig. 9 is a diagrammatic view of the operating cable for one wing.

Fig. 10 is a detail view illustrating a wing hinge member.

Fig. 11 is a detailed view, in full size, showing the method of connecting the quills of the feather-like members with the outer end of the air-foil portion of the wing.

Fig. 12 illustrates the method of attaching the flexible cable to the truss-work over the body of the machine.

Fig. 13 is a plan view of one of the wing tip feather members.

Fig. 14 is an edge view illustrating the feather member shown in Fig. 13 when the wing is being beat downwardly and illustrates the flexibility of the feather.

Fig. 15 is an illustration of the feather member with the wing being beat in an upward direction and showing the twist of the feather, which reacts against the wind as the sculling of an oar to propel the machine forward.

Fig. 16 is a sectional view taken on the curved line 16—16 of Fig. 1 showing the relation of portions of the feather members when the wing is being beat in an upward direction.

Fig. 17 is a true section taken on line 17—17 of Fig. 1 showing the opening up of the feather members during the up-beat of a wing.

Fig. 18 is a true section taken on the same line 17—17 of Fig. 1 and illustrates a closing up of the feather-like members when the wing is beat in a downward direction.

Figure 1:
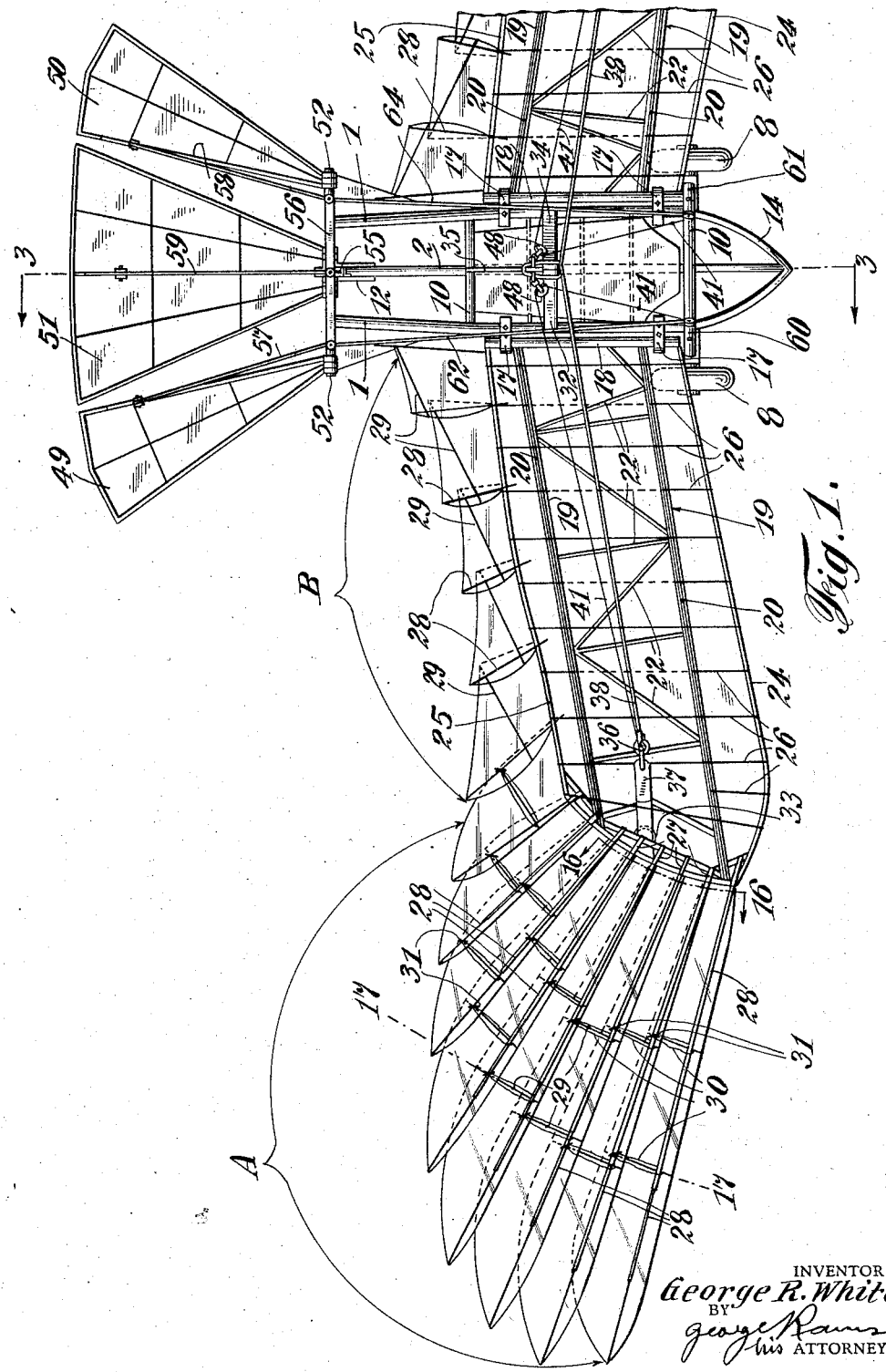
Fig. 1 is a plan view illustrating the preferred form of the invention with one wing broken away.

The preferred form of the invention comprises frame-work members built up from metal tubular structure or other light-weight material having great strength. A rigid body portion is made up of a pair of upper frame members 1 and a lower frame member 2. These frame members are connected together by struts 4 and 5 which are welded to the body frame members and form triangular brace members. A pair of wheel supporting struts 6 extend downwardly from the upper frame members 1 and carry an axle 7 upon which is mounted a pair of wheels 8. Brace rods 9 are welded to the lower frame member 2 and connect with the lower portion of the wheel struts 6. This forms a strong support for the wheel axle. Cross members 10 are welded between the two upper frame members 1 so that the frame is substantially a longitudinally extending open triangular member. A vertical tail supporting member 11 is welded to the lower frame member 2 and to the upper cross member 52. This tail support may have a suitable ground contact member such as a wheel or skid 12. The front end of the frame preferably terminates in a tripod portion 14. The main body frame carries a light frame-work 15 supporting a sheet metal seat 16 of duralium or other light material. This frame-work 15 is constructed of stream-like form and comprises the fuselage of the machine. The frame-work 15 and also the tripod nose portion 14, are both covered with "protectoid" celluloid, preferably of the thickness of three one-thousandths of an inch. The upper frame members 1, at their forward ends, carry bearing members 17 in which the shafts 18 of the wings are adapted to oscillate. These shafts 18 of the wings are welded to the main girders 19 of the wing trusses. (See Figs. 1, 6, and 10). The air-foil or rigid section of each wing is made up of two trusses comprising main girders 19 and upper stringers 20 directly over the main girders with bridging members 21 between the stringers and the main girders. Braces 22 extend between the trusses to support the same (Figs. 1, 6, 7, and 8). The entering edge of the air-foil is outlined by a tubular member 24 and the trailing edge of the air-foil is outlined by a tubular member 25. Forming members 26, also comprising small tubes, encircle the trusses, the entering edge member and trailing edge member. This entire series of tubes is all welded together to form a frame-work for a cambered air-foil in which the under surface is very slightly concave adjacent the bearing member 17 (see Fig. 8), and is gradually more concave toward the outer portion of the air-foil. The air-foil has a gradual upward curve to the under portion until near the outer end thereof, when there is a substantially abrupt downward curve forming a peak or angular portion near the outer end of the air-foil. The greatest depth of the cavity in the under surface of the air-foil occurs at substantially the angular bend indicated at the section line 7—7 in Fig. 6.

This air-foil frame-work is also covered with tightly stretched "protectoid" celluloid with the joints forming the edges thereof being cemented together in such manner that the covering of the frame-work is a substantially continuous membrane hermetically sealed and forming an air-foil of drum-like characteristics. Preferably the celluloid on the entering edge is slightly thicker, than the remainder of the covering. A plurality of quill receiving sockets 27 (see Fig. 11) are welded to the outer end and to the trailing edge of the air-foil frame-work. These quill sockets 27 comprise tubular receptacles to receive quill members 28. The quill members 28 may be made of various materials but preferably are formed of flexible steel tubing of the type commonly used for fishing rods. In the longer quills the tubing is preferably graduated in size from the base of the quill toward the tip thereof in such manner that the tip comprises the most flexible portion. These quills 28 carry welded on cross bars 29 (Figs. 1 and 13) forming supporting members. Each of the quills are preferably covered with flat "protectoid" celluloid to comprise feathers. The eight feathers, designated as group A, Fig. 1, are the primary feathers; and the five feathers, designated as group B, are the secondary feathers. The longest feather forming the end portion of the wing is preferably slightly less in length than the drum or air-foil section of the wing. The length of the feathers gradually decreases as the end of the wing is rounded and the angularity between the quills of the feathers is such that the axes of the feathers diverge slightly from the tip-most feather to the one adjacent the bearing 17 in such manner that the direction of the quills gradually changes from a slight sweep-back at the tip of the wing to a direction approaching more nearly parallel to the line of flight adjacent the body of the machine. The feathers are of such width as to overlap throughout their entire length except a small portion adjacent the outermost ends of the feathers. Flexible cords 30 extend between adjacent feathers and are attached thereto in such manner that if the angle between the quills tends to increase, as on the down beat of the wing, the flexible cords or cables limit this movement. Another set of flexible cords or cables 31 extend from the quill of one feather to the outer end of the cross-bar 29 of the adjacent forward feather. This limits the opening of the feathers in a louver-like manner, as on the up-stroke of the wing, as indicated in Fig. 17. It will be observed from Fig. 1 that in the preferred form of the wings the air-foils or drums extend forwardly from the bearings at the body portion to the outer ends of these air-foils adjacent the deepest camber thereof and that the entering edges of the tips of the wings extend from this point to the tips of the front edge feathers backwardly to provide a decided sweep back to the points of the wings.

By reference to Fig. 2 it will be observed that the wing is built with a definite flat V-shape, the apex of the V-shape being adjacent the deepest camber of the air-foil portion of the wing. It will also be noted that the rigid air-foil portions of the wings taper in thickness from the bearing shafts 18 outwardly with the thickest portion occurring at the bends of the wings adjacent the section 7 (Fig. 6), and from this thick portion the wings rapidly decrease in thickness to the outer edges of the rigid air-foils where the end feather quills are attached.

A vertically extending tripod comprising struts 32, 34 and 35 is secured to the upper main frame members 1 and the cross strut 4. A flexible cable 38, preferably a one-half inch rubber cable, is wound about the upper end of this tripod (Fig. 12) and extends in opposite directions with each end of the cable being attached to one of the wing members by being secured to rings 36 carried by straps or rods 37 that are secured to the frame-work of the outer ends of the rigid air-foils. Flexible steel cables 33 extend around the rods 37 and then around the ends of the air-foil frames to terminate in fixed rings 39 to which are connected lower flexible tension members 40. There are two of these members 40, namely, one for each wing, and the inner ends of the members 40 are attached to the brace rods 9 which extend to the wheel axle 7. The upper cables 38 and lower flexible cable 40 are tensioned in such manner as to maintain the wings in an outstretched position relative to the body of the machine. Preferably, the lower cables 40 are of slightly greater strength than the upper cable 38 and in the machine which has been flown, the lower cables 40 comprised a five-eighths inch rubber cable. The lower cables 40 are also tensioned to a slightly greater degree than the upper cable 38, thereby tending to pull the wings slightly downward until the tension is equalized by the upper cable 38. This has the effect of permitting the wings to assume the position in flight due to the additional pull on the lower cable when the machine is supported by the air during flight. When the machine is in flight, there are times when the operator may desire to glide and therefore, the lower cables 40 maintain the wings outstretched in such manner as to sustain the weight of the machine without substantial effort on the part of the operator.

An operating mechanism is provided for each wing and comprises a cable 41 in which a stirrup 42 is mounted in such manner as to receive the operator's foot whereby raising and lowering of the foot will raise and lower, or in other words, beat the wings. In order that this may be brought about, the operating cable 41 for each wing runs from the stirrup 42 upwardly over a pulley 44 mounted on the main frame, then downwardly over another pulley 45 mounted on the brace rod 9 and thence outwardly to the ring 39 in the anchor cable 33. The other portion of the operating cable 41 secured to the bottom of the stirrup 42 runs downwardly to a pulley 46 mounted on the axle 7, then upwardly over a guide pulley 47 and over the direction pulley 48 mounted on the upper end of the tripod extending above the main frame, then outwardly to the ring 36 where the end of the operating cable is anchored. It will be observed by reference to Fig. 9 that an upward pull on the stirrup 42 produces a tension on the upper portion of the operating cable 41 tending to lift the wing, and that a downward push on the stirrup 42 will reverse the direction of the tension in the operating cable 41 tending to beat the wing downwardly.

The tail of the machine, which it will be observed from Fig. 1 is close to the body relative to the wing spread, in the machine which was flown, comprising three sections, namely, side members 49 and 50 and a central member 51, all of which are mounted to oscillate around a cross bar 52 welded to the rear ends of the main frame members 1. A vertically extending operating arm 54 is mounted in the middle forward end of the central member 51 to oscillate on the cross bar 52 and extends upwardly in a vertical direction. A stationary guide segment 55 is provided to relieve the bearing of this arm from side strains. A cross arm 56 is pivoted on the upper end of the vertical arm 54 and oscillates in a plane at right angles to the axis of movement of the vertical arm 54. Rigid links 57 and 58 extend from the ends of the cross arm 56 to the side tail members 49 and 50 respectively, and rigid link 59 extends from the middle or pivot of the cross arm 56 to the central tail member 51. Elevating levers 60 and 61 are pivoted at their lower ends adjacent the front of the main frame and stiff links 62 and 64 extend from the upper end of these elevating levers to the outer ends of the cross arm 56 respectively. From the foregoing, it will be observed that a forward movement oscillating both elevating levers 60 and 61 to the same extent will oscillate all three tail members in an upward direction to the same extent; whereas if one operating lever 60 be pushed forward to a greater extent than the other operating lever, the cross arm 56 will turn on its pivot and correspondingly advance the respective side tail member relative to its companion side tail member on the other side of the machine. However, the entire tail may be raised or lowered either flat or in this twisted position.

In flights which have been made with a machine of the exact construction illustrated and described, the machine has been first towed by outside power, such as an automobile or the like, until the machine has been lifted from the ground, which occurs at a speed of eighteen to twenty miles per hour. The towing cable has been released and the operator by beating the wings at a speed of about eighty to one hundred beats per minute has flown the machine free and clear from any towing mechanism, in a free flight. During this operation, banking and turning was accomplished largely by beating of the wings without reference to the tail control members, which, however, may be used if desired. The main function of the tail being to maintain the desirable altitude and also to act as a brake when the machine is being landed. When the machine is in flight, the down stroke of the wing reacts on the air beneath the wing and causes the machine to rise upwardly or gain altitude. At this time, the wing feathers tend to spread and close up tightly against each other as indicated in Fig. 18, thereby trapping the air beneath the wing. On the up-stroke of the wing, the feathers open up slightly and the back portion of the feathers twist in a downward direction permitting the air to slide over the feathers in an action similar to an oar when used to scull a boat. This action causes a very strong forward push to the machine which gives speed or propulsion. The rigid air-foil portion of the wings is effective during forward flight in a somewhat similar manner to the wing of a screw propelled aeroplane in that it tends to maintain the altitude already gained on the down stroke and also may even gain altitude on the up-stroke because of the dynamic impact of the air against the air-foil portion of the wing during forward motion produced by the sculling action of the feathers. The tension on the cables 38 and 40 which hold the wings in outstretched position permit the wings to be oscillated with a relatively small additional power, in view of the fact that the weight sustaining element is the lower cables 40. The flights with the device shown and described demonstrate that the present machine may be flown entirely by man-power without undue stress upon the operator. It is understood, however, that the arrangements and devices involved in the disclosure herewith may be utilized in connection with a mechanical power drive, such as a hydrocarbon engine with suitable driving mechanism arranged to beat the wings and under control of the operator whereby the operator's attention may be directed to elevation and guiding rather than to maintaining the wing beats manually in order to sustain the plane in flight.

It will be observed that the rubber cables 38 and 40 are attached to the wings in such manner as to form a part of triangles on each side of the body portion (see Fig. 2). These triangles have bases which incline slightly upwardly and inwardly to meet at the tip of the tripod above the body portion, and with the air-foil portions of the wings extending from the tips of the triangles to substantially the mid portions of the bases of the triangles. This triangular arrangement of forces due to the tension of the cables 38 and 40 is therefore balanced and equalized on each side of the pivots for the wings.

In the machine which was flown and herewith described, the wings comprising the feathers and the air-foil portion, the body or fuselage, and the tail portions, were all covered with "protectoid" celluloid. It is to be understood that various light weight covering means may be used including thin sheets of flexible metal. Where flexible metal is used the metal, comprising the feathers, may be formed in such manner as to dispense with the quills, although the quills are the preferred construction. While the specification discloses the tail member as comprising various sections, the machine may be flown satisfactorily by a tail piece comprising a single section which is manipulated by one control lever to control the direction of flight as to elevation.

Having described my invention, I claim:

1. In a flying machine, a wing comprising an air-foil section and a feathered section, the feathered section comprising a plurality of feathers having twistable quills, and means to limit the twisting of said quills relative to each other.

2. A flying machine comprising a wing having an air-foil section and a feathered section, said feathers comprising twistable quills covered by flexible material, and means to limit the louver action of said feathers.

3. A flying machine comprising a wing having an air-foil section and a feathered section, said feathers comprising twistable members adapted to open in the manner of movable louvers, and means to limit the louver action of said feathers.

4. A machine of the ornithopter type comprising a body portion, a pair of wings pivoted to said body portion, a flexible cable extending over said body portion and connected to substantially the mid portion of said wings on the upper side thereof, and flexible means extending from the body frame-work to said wings to substantially the mid under portion of said wings, both of said flexible means being under tension.

5. A flying machine of the ornithopter type comprising a body portion, a pair of wings having an air-foil portion pivoted to said body portion, a rubber cable extending across and above said body portion and attached to the upper portion of said wings, lower rubber cables extending from the body frame-work and attached to the lower portion of said wings, the arrangement of said rubber cables being substantially that of a pair of triangles with the bases adjacent the body and with the air-foil portion of the wings extending from the tip of the triangles to substantially the mid portion of the base thereof.

6. In a flying machine; a fuselage; wings extending in opposite directions from said fuselage, said wings comprising rigid cambered portions having a substantial thickness, feathers extending from the trailing edges of said cambered portions, said feathers comprising flexible membrane members with the inner ends of the flexible members forming a continuation of the trailing edge of the cambered portions and with the outer ends of said flexible members twistable to form the membranes of said flexible members at the outer ends thereof into a plurality of twisted surfaces blending into a continuous surface at the edges of the cambered portions.

7. In a flying machine; a fuselage; wings extending in opposite directions from said fuselage, pivots to permit said wings to move upwardly and downwardly, said wings comprising rigid cambered portions, feathers extending from the trailing edges of said cambered portions, said feathers comprising flexible membrane members with the inner ends of the flexible members forming a continuation of the trailing edge of the cambered portions and with the outer ends of said flexible members twistable to form the membranes of said flexible members at the outer ends thereof into a plurality of twisted surfaces adapted to comprise propelling means when the wings move upwardly.

8. In a flying machine, a wing comprising an air-foil portion and a feathered portion, said feathers extending from the trailing edge of said air-foil portion and having overlapping outer ends adapted to twist in one direction whereby said feathers when twisted form a plurality of twisted surfaces blending into a common surface adjacent the trailing edge of said air-foil portion, which twisted surfaces react against the air as propelling members to push said wing forward.

GEORGE R. WHITE.